United States Patent
Sagawa et al.

(10) Patent No.: US 7,442,445 B2
(45) Date of Patent: Oct. 28, 2008

(54) BRAZING CLAD MATERIAL, AND BRAZING METHOD AND BRAZING PRODUCT USING THE SAME

(75) Inventors: Hideyuki Sagawa, Nakagun (JP); Hiromitsu Kuroda, Hitachi (JP); Kazuma Kuroki, Hitachinaka (JP); Humio Horii, Hitachi (JP); Tetsuya Tokumitu, Hitachi (JP); Nobuhito Sakuyama, Hitachi (JP); Shigeru Okamoto, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 320 days.

(21) Appl. No.: 11/315,599

(22) Filed: Dec. 23, 2005

(65) Prior Publication Data

US 2006/0166028 A1 Jul. 27, 2006

(30) Foreign Application Priority Data

Dec. 24, 2004 (JP) ............................. 2004-373547

(51) Int. Cl.
 *B23K 1/19* (2006.01)
 *B23K 1/00* (2006.01)
 *B32B 15/01* (2006.01)
 *B32B 15/18* (2006.01)

(52) U.S. Cl. .................. 428/679; 428/642; 428/680; 428/681; 228/232; 228/262.31; 228/262.45; 228/262.72

(58) Field of Classification Search .................. None
See application file for complete search history.

(56) References Cited

U.S. PATENT DOCUMENTS

2005/0260437 A1  11/2005  Kuroki et al.

FOREIGN PATENT DOCUMENTS

| DE | 102005022193 A1 | 12/2005 |
|---|---|---|
| JP | 07-299592 A | 11/1995 |
| JP | 2000-107883 A | 4/2000 |
| JP | 2002-363707 A | 12/2002 |
| JP | 2003-117678 A | 4/2003 |
| JP | 2005-052873 A | 3/2005 |

OTHER PUBLICATIONS

JP 2003-117686 English Machine Tranlastion, Hiromitsu et al, Apr. 2003.*
JP 2003-117678 English Machine Tranlastion, Hiromitsu et al. Apr. 2003.*
JP 2002-363707 English Machine Tranlastion, Hiromitsu et al, Dec. 2002.*

* cited by examiner

*Primary Examiner*—Keith D. Hendricks
*Assistant Examiner*—Jason L Savage
(74) *Attorney, Agent, or Firm*—Foley & Lardner LLP

(57) ABSTRACT

A brazing clad material is a composite material that comprises a base material and a brazing material layer formed integrally on the base material. The brazing material layer has a Ni or Ni alloy layer, a Ti or Ti alloy layer and a Fe—Ni alloy layer that are sequentially stacked in this order on the base material. The brazing material layer has a Fe concentration of 25 to 40 wt % in the entire brazing material layer. The brazing material layer satisfies a ratio of W1/W2 to be 0.56 to 0.66, where W1 is a weight of Ni contained in the entire brazing material layer and W2 is a total weight of Ni and Ti contained in the entire brazing material layer.

10 Claims, 1 Drawing Sheet

10 BRAZING CLAD MATERIAL
11 BASE MATERIAL
15: BRAZING MATERIAL LAYER
12: Ni or Ni ALLOY LAYER
13: Ti or Ti ALLOY LAYER
14: Fe-Ni ALLOY LAYER

15: BRAZING MATERIAL LAYER
   12: Ni or Ni ALLOY LAYER
   13: Ti or Ti ALLOY LAYER
   14: Fe-Ni ALLOY LAYER

BRAZING CLAD MATERIAL, AND BRAZING METHOD AND BRAZING PRODUCT USING THE SAME

The present application is based on Japanese patent application No. 2004-373547, the entire contents of which are incorporated herein by reference.

BACKGROUND OF THE INVENTION

1. Field of the Invention

This invention relates to a brazing clad material, and a brazing method and a brazing product using the same. In particular, this invention relates to a brazing clad material that is used to braze a member of a heat exchanger, fuel cell etc.

2. Description of the Related Art

Stainless base clad materials are used as a bonding material for automobile oil cooler. It is composed of a stainless steel sheet as a base material, and a copper material which is cladded on one or both surfaces of the stainless steel plate and serves as a brazing material.

Various Ni brazing materials with excellent corrosion resistance at a brazing joint part are specified by JIS (Japanese Industrial Standards) as a brazing material for a member which is made of stainless steel, Ni-based or Co-based alloy etc.

For example, JP-A-2000-107883 discloses a powdered Ni brazing material for heat exchanger that comprises 4 to 22 wt % of metal powder selected from Ni, Cr or Ni—Cr alloy.

JP-A-7-299592 discloses a self-brazing composite material that has a brazing material laminar structure of Ni/Ti/stainless steel, in which a brazing material layer made of Ni and Ti is formed on the surface of a base material of stainless steel.

However, when the conventional brazing material or brazing clad material is used as a brazing material in brazing a heat exchanger such as a cooler of fuel cell reformer or exhaust gas recirculation (EGR) which is exposed to high-temperature and corrosive gas or liquid, the following problems may occur.

(1) When the abovementioned stainless base clad material is used as a brazing material for the automobile oil cooler, there is no problem in heat resistance and corrosion resistance. However, when the stainless base clad material is used as a brazing material for the cooler of fuel cell heat exchanger or EGR, there is a problem in corrosion resistance. Namely, since high-temperature and corrosive solution or exhaust gas is circulated in the cooler of fuel cell heat exchanger or EGR, the brazing material, i.e., the copper material, is insufficient in corrosion resistance.

(2) The self-brazing composite material, i.e., the Ni—Ti clad material as disclosed in JP-A-7-299592 may be subjected to "erosion of base material" that a component of the base material is melted into (diffused into) the brazing material in brazing. In such a case, the base material will be significantly eroded by the brazing material such that it decreases in thickness. As a result, a problem will be caused that strength at the brazing joint part lowers.

(3) The powdered Ni brazing material as disclosed in JP-A-2000-107883 or the Ni brazing materials as specified by JIS are in powder form. Therefore, the powdered Ni brazing material needs to be coated on each brazing joint part. Thus, the brazing work needs a large amount of labor and the productivity of the brazing product lowers significantly. This causes an increase in manufacturing cost. Further, since amorphous Ni brazing materials specified by JIS are very fragile, they are difficult to handle in producing the brazing material and in assembling the brazing product. The manufacturing cost increases as well.

SUMMARY OF THE INVENTION

It is an object of the invention to provide a brazing clad material that can substantially prevent "erosion of base material" and have excellent corrosion resistance and brazing productivity.

It is another object of the invention to provide a brazing method and a brazing product using the brazing clad material.

(1) According to one aspect of the invention, a brazing clad material comprises:

a composite material that comprises a base material and a brazing material layer formed integrally on the base material, wherein the brazing material layer comprises a Ni or Ni alloy layer, a Ti or Ti alloy layer and a Fe—Ni alloy layer that are sequentially stacked in this order on the base material, the brazing material layer comprises a Fe concentration of 25 to 40 wt % in the entire brazing material layer, and the brazing material layer satisfies a ratio of W1/W2 to be 0.56 to 0.66, where W1 is a weight of Ni contained in the entire brazing material layer and W2 is a total weight of Ni and Ti contained in the entire brazing material layer.

In the above invention, the following modifications and changes can be made.

(i) The composite material satisfies a ratio of T2/T1 to be 0.05 to 0.12, where T2 is a thickness of the brazing material layer and T1 is a total thickness of the brazing clad material.

(ii) The brazing material layer comprises a diffusion reacting layer with a thickness of 2 to 6 μm, and the diffusion reacting layer is formed at an interface between two hetero-metals of the Ni or Ni alloy layer, the Ti or Ti alloy layer and the Fe—Ni alloy layer to compose the brazing material layer.

(iii) The Fe—Ni alloy layer comprises Fe-35 to 45 mass % Ni.

(iv) The base material comprises an alloy comprising Fe as a main component.

(v) The alloy comprising Fe as a main component comprises a stainless steel.

(2) According to another aspect of the invention, a method of brazing the brazing clad material as defined in above (1) to a brazed member comprises the steps of:

preheating the brazing clad material at a temperature of 800 to 940° C.; and brazing the preheated brazing clad material to the brazed member in a vacuum atmosphere at a temperature of 1100 to 1200° C.

In the above invention, the following modifications and changes can be made.

(vi) The vacuum atmosphere comprises a vacuum degree of $1\times10^{-2}$ Pa or less.

(vii) The vacuum atmosphere comprises a gas atmosphere substantially not containing $N_2$ gas and a vacuum degree of $1\times10^{-2}$ Pa or less.

(3) According to another aspect of the invention, a brazing product comprises:

the brazing clad material as defined in above (1); and a brazed member, wherein the brazing clad material is brazed to the brazed member.

(4) According to another aspect of the invention, a brazing product comprises:

the brazing clad material as defined in above (1); and a brazed member, wherein the brazing clad material is brazed to the brazed member by the method as defined in above (2).

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
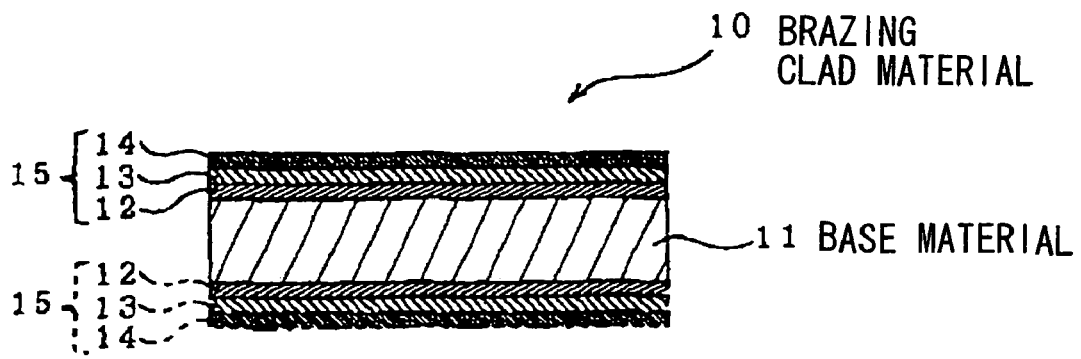
FIG. 1 is a longitudinal cross sectional view showing a brazing clad material in a preferred embodiment according to the invention.

FIG. 1 is a longitudinal cross sectional view showing a brazing clad material in the preferred embodiment according to the invention.

Brazing Clad Material

As shown, the brazing clad material 10 of this embodiment to be brazed to a brazed member is a composite material that a brazing material layer 15 is integrally formed on the surface (i.e., only an upper surface thereof in FIG. 1) of a base material 11. By suitably rolling the composite material, the brazing clad material 10 (as a final product) with a desired thickness can be obtained. Herein, the surface of the base material 11 means all surfaces being exposed externally.

The brazing material layer 15 is composed of a Ni (or a Ni alloy) layer 12, a Ti (or a Ti alloy) layer 13 and a Fe—Ni alloy layer 14 that are sequentially formed on the base material 11 to clad it.

The weight ratio (or concentration) of Fe contained in the entire brazing material layer 15 is set to be 25 to 40 wt %, preferably 30 to 35 wt %. In other words, the brazing clad material 10 is prepared such that the entire brazing material layer 15 has a composition of Ni—Ti—(25 to 40 wt % of) Fe. This preparation can be conducted by controlling each thickness of the layers 12, 13 and 14 or by controlling each alloy composition of the layers 12, 13 and 14. The reason why the content (concentration) of Fe is set to be 25 to 40 wt % is as follows. If the content of Fe is less than 25 wt %, elution of Fe from the base material 11 to the brazing material layer 15 cannot be prevented effectively. If the content of Fe is more than 40 wt %, the metal flow property of the brazing material lowers.

The weight W1 of Ni contained in the entire brazing material layer 15 and the sum W2 of the weight of Ni and Ti each contained in the entire brazing material layer 15 are prepared such that the ratio W1/W2 is 0.56 to 0.66, preferably 0.58 to 0.65, more preferably 0.58 to 0.62. This preparation can be conducted by controlling each thickness of the layers 12, 13 and 14 or by controlling each alloy composition of the layers 12, 13 and 14. The reason why the ratio W1/W2 is set to be 0.56 to 0.66 is as follows. If the ratio W1/W2 is less than 0.56 or more than 0.66, the metal flow property of the brazing material lowers significantly or the brazing material does not melt.

The ratio T2/T1 (or T2×100/T1) of the thickness T2 of the brazing material layer 15 and the total thickness T1 of the brazing clad material 10 is set to be 0.05 to 0.12 (or 5 to 12%), preferably 0.06 to 0.10 (or 6 to 10%). The reason why the ratio T1/T2 is set to be 0.05 to 0.12 is as follows. If the ratio T2/T1 is less than 0.05, the thickness of the brazing material layer 15 needs to be reduced sufficiently before when the brazing material layer 15 is integrated with the base material 11. Therefore, the processing cost increases significantly. If the ratio T2/T1 is more than 0.12, the material cost of the brazing material layer 15 increases. Further, if the ratio T2/T1 is more than 0.12, warping may occur depending on the shape after pressing when the brazing clad material 10 has the brazing material layer 15 formed on one surface of the base material 11. As a result, the melt may leak at the brazing joint part.

The brazing clad material 10 has a diffusion reacting layer (not shown) with a thickness of 2 to 6 µm, preferably 2 to 4 µm at each interface between the hetero-metals in the layers 12, 13 and 14 to compose the brazing material layer 15.

The Fe—Ni alloy layer 14 comprises Fe—(35 to 45 mass % of) Ni, preferably Fe—(36.0 to 36.5 mass % of) Ni (e.g., invar (registered trademark)) or Fe—(42mass % of) Ni (e.g., 42 alloy).

The reason why the Ni, Ti and invar (registered trademark: or 42 alloy) are selected for the brazing material layer 15 of the brazing clad material 10 of this embodiment is that they are easy available in its sheet or foil material and excellent in processability such as in rolling, pressing or drawing.

The brazing material layer 15 may contain 0.02 to 10.0 wt %, preferably 0.02 to 5.0 wt %, of P (phosphorus) in the entire brazing material layer 15. Thereby, the metal flow property and oxidation resistance of the brazing material can be significantly improved. The reason why the content of P is set to be 0.02 to 10 wt % is as follows. If less than 0.02 wt %, the metal flow property cannot be substantially improved. If more than 10 wt %, the strength may lower depending on the kind of brazed material.

The base material 11 can be composed of the same or nearly equal material as a component (brazed member) to compose a brazing product as described later. For example, the base material 11 can be made of preferably a Fe-based alloy comprising Fe as a main component, more preferably a stainless steel, most preferably austenite stainless steel. The reason why the stainless steel is preferred as the Fe-based alloy is as follows. It has a sufficient corrosion resistance under the same circumstances as the brazing material with the excellent corrosion resistance is used, and it is a versatile material available at a relatively low cost, and it is excellent in processability such as in rolling, pressing and drawing.

The brazing clad material 10 of this embodiment may be, if necessary, subjected to thermal treatment before rolling the composite material. In the thermal treatment, the heating temperature and time can be suitably controlled according to the laminar structure of the brazing material layer 15 or to the composition and thickness of the layers 12, 13 and 14 such that the brazing clad material 10 has a stretch of 30% or more.

The brazing clad material 10 thus obtained is formed into a semifinished product with a desired shape by rolling, pressing or drawing. Then, the semifinished product is combined with a brazed member (not shown) to allow the contact with a part (brazing joint part) to be brazed. Then, the brazing is conducted by heating the combined members, mainly the brazing joint part, to have a brazing product. Alternatively, the brazing clad material 10 can be used as the brazed member. For example, plural brazing clad materials 10 of this embodiment are provided. The composite materials 10 each are formed into semifinished products with a desired shape by pressing etc. The semifinished products are combined to allow a contact with the brazing joint parts. Then, the brazing can be conducted by heating the combined members to have a brazing product.

Although the brazing clad material 10 of this embodiment is composed such that the brazing material layer 15 is formed on only one surface (i.e., the upper surface in FIG. 1) of the base material 11, the invention is not limited to this embodiment. For example, the brazing clad material 10 may be composed such that the brazing material layer 15 is formed on both surfaces (i.e., the upper and lower surfaces in FIG. 1) of the base material 11.

Modification of the Brazing Clad Material

Figure 2:
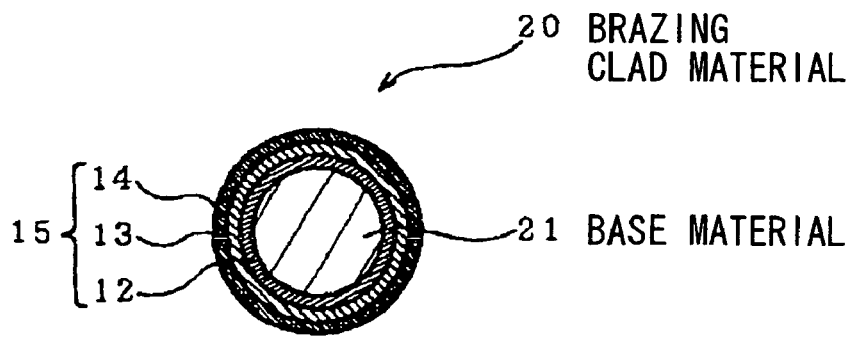
FIG. 2 is a cross sectional view showing a modification of the brazing clad material in FIG. 1.

Although the brazing clad material 10 of this embodiment is composed such that the composite material with the brazing material layer 15 is foil-shaped (or sheet-shaped), the invention is not limited to this shape. Alternatively, as shown in FIG. 2 which illustrates a modification, the Ni (or Ni alloy) layer 12, the Ti (or Ti alloy) layer 13 and the Fe—Ni alloy layer 14 may be integrally formed sequentially on a base material 21, which is formed a round bar or wire, to compose a brazing clad material 20. In this case, the base material 21 can be made of the same material as the base material 11. The layers 12, 13 and 14 can be formed by plating, extruding, tubing etc.

Brazing Product

The brazing product using the brazing clad material 10 of this embodiment can be a heat exchanger such as a reformer cooler of fuel cell, in which high-temperature and corrosive gas or liquid circulated, an EGR cooler, a fuel cell member, an oil cooler, a radiator, a secondary battery member etc. The brazing clad material of this embodiment, especially the round-bar or wire-shaped brazing clad material 20 (as shown in FIG. 2) is provided with a small diameter and an excellent handling property. Therefore, it is also applicable to an oil cooler, a radiator, a secondary battery member etc. other than a heat exchanger such as a reformer cooler of fuel cell, an EGR cooler, a fuel cell member etc.

Brazing Method

A method of brazing the brazing clad material 10 of this embodiment will be described below.

The brazing clad material 10 of this embodiment is formed into a semifinished product with a desired shape by rolling, pressing or drawing. The brazing clad material 10 can be in advance subjected to the thermal treatment such that the base material 11 has a stretch of 30% or more. Due to the thermal treatment, the base material 11 of the brazing clad material 10 can be sufficiently annealed and softened to have a sufficient stretch. Further, due to the thermal treatment, the 2 to 6 µm thick diffusion reacting layer can be formed at each interface between the hetero-metals in the layers 12, 13 and 14, i.e., at the interface between the Ni layer 12 and the Ti layer 13 and at the interface between the Ti layer 13 and the Fe—Ni alloy layer 14, to compose the brazing material layer 15. As a result, since the brazing clad material 10 can have an excellent pressing property (or processability), no crack or warping in the semifinished base material occurs after the pressing. Thus, the semifinished product with a desired shape can be produced at a good yield and precision.

The thermal treatment for softening the base material 11 can be conducted such that the diffusion reacting layers each have a thickness of 2 to 6 µm. The thermal treatment can be adjusted by controlling the temperature and time thereof. The reason why the diffusion reacting layers are controlled to have a thickness of 2 to 6 µm is as follows. If less than 2 µm, the thermal treatment becomes insufficient to soften the base material 11. If more than 6 µm, the entire brazing material layer 15 becomes too high in hardness to have a sufficient stretch. Therefore, the brazing material layer 15 may be peeled off to cause a difficulty in processing a semifinished product thereof.

Then, the semifinished product (i.e., the brazing clad material 10) is combined with a brazed member (not shown) to allow the contact with a brazing joint part. Then, the brazing is conducted by heating the combined members. Prior to the brazing, the semifinished product (or both of the semifinished product and the brazed member) is subjected to preheat treatment at temperature of 800 to 940° C., preferably 850 to 940° C., more preferably 880 to 920° C. Due to the preheat treatment, Ti to reduce the metal flow property when being reacted with gas (i.e., $N_2$, $O_2$ and C) in brazing atmosphere can be prevented from being diffused (or exposed) onto the outermost surface of the brazing material layer 15. Also, stress in the semifinished product being processed into a desired shape can be relaxed. Further, due to the preheat treatment, thermal deformation at the brazing temperature (of 1100 to 1200° C.) can be relaxed as well as enhancing uniformity in thermal property of the entire brazing material. Thus, the reliability of the brazing join part can be enhanced.

Then, the brazing is conducted to the preheated semifinished product and the brazed member at a temperature of 1100 to 1200° C. in such an atmosphere that the vacuum degree is $1 \times 10^{-2}$ Pa or less, preferably the vacuum degree is $1 \times 10^{-2}$ Pa or less and $N_2$ is not contained. The reason why the vacuum degree is set to be $1 \times 10^{-2}$ Pa or less is as follows. Since the brazing temperature is as high as more than 1000° C., the component of the brazing material may be well reacted with gas, such as C, $O_2$ and $N_2$, in the atmosphere to lower the metal flow property of the brazing material if the amount of gas is much. Especially, $N_2$ can be reacted with Ti in the brazing material to form a compound of TiN to reduce significantly the metal flow property. Therefore, the brazing is desirably conducted in such an atmosphere that the vacuum degree is $1 \times 10^{-2}$ Pa or less and $N_2$ is not contained.

Effects of the Embodiment

By the brazing, the brazing material layer 15 (i.e., brazing material) can be melted at the brazing join part. In the brazing, the brazing material layer 15 adjacent to the base material 11 has Fe being diffused inside thereof during the thermal process from the preheat treatment to the melting of the brazing material layer 15. Therefore, even when Fe in the base material 11 melts into the brazing material layer 15 in the brazing, the Fe concentration of the brazing material layer 15 will be saturated instantly. Thus, since Fe of the base material 11 is prevented from melting into the brazing material layer 15, "erosion of base material" can be reduced significantly. Further, since the Fe concentration in the entire brazing material layer 15 is set to be 25 to 40 wt % so as not to harm the metal flow property of the brazing material, the brazing material can be excellent in metal flow property. As a result, after the brazing, the reduction of strength can be prevented at the base material 11, especially the brazing join part. Further, the base material 11 can be prevented from being eroded.

As such, the brazing product with "erosion of base material" reduced at the brazing join part can be stably produced commercially by brazing the brazing clad material 10 of this embodiment to the brazed member (e.g., a stainless steel sheet). The base material 11 of the brazing product can be substantially kept from lowering in strength even as compared to that before the brazing. The base material 11 can be substantially kept from being eroded and can have a high reliability.

Further, since the brazing clad material 10 (as shown in FIG. 1) of this embodiment is composed such that the brazing material layer 15 is integrated with the base material 11, no brazing material needs to be disposed between the base material 11 and the brazing join part of the brazed member. Therefore, the brazing product of this embodiment can be produced in excellent brazing productivity.

Although the preferred embodiment of the invention is explained above, the invention is not always limited to the embodiment and can be modified within the concept thereof.

EXAMPLES

Examples 1-1 to 1-6, 2-1 to 2-5 and 3-1 to 3-2 of the invention will be described below as well as comparative examples and conventional examples.

Example 1-1

A composite material is made such that a 0.52 mm thick Ni strip, a 1.0 mm thick Ti strip and a 0.72 mm thick invar (registered trademark) strip are stacked sequentially on the surface of a stainless steel strip (i.e., a SUS304 strip) as a base material, and then they are cladded by rolling. Then, by repeating the rolling, a brazing clad material is made in which the brazing material layer in three-layer structure (i.e., invar/Ti/Ni) has a total thickness of 70 μm. The Fe concentration in the entire brazing material layer is set to be 25 wt %.

The brazing clad material is preheated at 900° C. in a tubular furnace kept at a vacuum degree of $1 \times 10^{-3}$ Pa, and then it is heated at a temperature of 1200° C. to melt the brazing material layer. Thereupon, brazing properties thereof are evaluated.

Example 1-2

A composite material is made such that a 0.42 mm thick Ni strip, a 1.0 mm thick Ti strip and a 1.01 mm thick invar (registered trademark) strip are stacked sequentially on the surface of a stainless steel strip (i.e., a SUS304 strip) as a base material, and then they are cladded by rolling. Then, in the same manner as Example 1-1, a brazing clad material is made. The Fe concentration in the entire brazing material layer is set to be 32 wt %.

The brazing clad material is thermally treated like Example 1-1. Thereupon, brazing properties thereof are evaluated.

Example 1-3

A composite material is made such that a 0.38 mm thick Ni strip, a 1.0 mm thick Ti strip and a 0.96 mm thick invar (registered trademark) strip are stacked sequentially on the surface of a stainless steel strip (i.e., a SUS304 strip) as a base material, and then they are cladded by rolling. Then, in the same manner as Example 1-1, a brazing clad material is made. The Fe concentration in the entire brazing material layer is set to be 32 wt %.

The brazing clad material is thermally treated like Example 1-1. Thereupon, brazing properties thereof are evaluated.

Example 1-4

A composite material is made such that a 0.55 mm thick Ni strip, a 1.0 mm thick Ti strip and a 1.16 mm thick invar (registered trademark) strip are stacked sequentially on the surface of a stainless steel strip (i.e., a SUS304 strip) as a base material, and then they are cladded by rolling. Then, in the same manner as Example 1-1, a brazing clad material is made. The Fe concentration in the entire brazing material layer is set to be 32 wt %.

The brazing clad material is thermally treated like Example 1-1. Thereupon, brazing properties thereof are evaluated.

Example 1-5

A composite material is made such that a 0.33 mm thick Ni strip, a 1.0 mm thick Ti strip and a 1.11 mm thick 42 alloy strip are stacked sequentially on the surface of a stainless steel strip (i.e., a SUS304 strip) as a base material, and then they are cladded by rolling. Then, in the same manner as Example 1-1, a brazing clad material is made. The Fe concentration in the entire brazing material layer is set to be 32 wt %.

The brazing clad material is thermally treated like Example 1-1. Thereupon, brazing properties thereof are evaluated.

Example 1-6

A composite material is made such that a 0.28 mm thick Ni strip, a 1.0 mm thick Ti strip and a 1.43 mm thick invar (registered trademark) strip are stacked sequentially on the surface of a stainless steel strip (i.e., a SUS304 strip) as a base material, and then they are cladded by rolling. Then, in the same manner as Example 1-1, a brazing clad material is made. The Fe concentration in the entire brazing material layer is set to be 40 wt %.

The brazing clad material is thermally treated like Example 1-1. Thereupon, brazing properties thereof are evaluated.

Comparative Example 1-1

A composite material is made such that a 0.55 mm thick Ni strip, a 1.0 mm thick Ti strip and a 0.64 mm thick invar (registered trademark) strip are stacked sequentially on the surface of a stainless steel strip (i.e., a SUS304 strip) as a base material, and then they are cladded by rolling. Then, in the same manner as Example 1-1, a brazing clad material is made. The Fe concentration in the entire brazing material layer is set to be 23 wt %.

The brazing clad material is thermally treated like Example 1-1. Thereupon, brazing properties thereof are evaluated.

Comparative Example 1-2

A composite material is made such that a 0.21 mm thick Ni strip, a 1.0 mm thick Ti strip and a 1.62 mm thick invar (registered trademark) strip are stacked sequentially on the surface of a stainless steel strip (i.e., a SUS304 strip) as a base material, and then they are cladded by rolling. Then, in the same manner as Example 1-1, a brazing clad material is made. The Fe concentration in the entire brazing material layer is set to be 43 wt %.

The brazing clad material is thermally treated like Example 1-1. Thereupon, brazing properties thereof are evaluated.

Comparative Example 1-3

A composite material is made such that a 0.32 mm thick Ni strip, a 1.0 mm thick Ti strip and a 0.90 mm thick invar (registered trademark) strip are stacked sequentially on the surface of a stainless steel strip (i.e., a SUS304 strip) as a base material, and then they are cladded by rolling. Then, in the same manner as Example 1-1, a brazing clad material is made. The Fe concentration in the entire brazing material layer is set to be 32 wt %.

The brazing clad material is thermally treated like Example 1-1. Thereupon, brazing properties thereof are evaluated.

Comparative Example 1-4

A composite material is made such that a 0.62 mm thick Ni strip, a 1.0 mm thick Ti strip and a 1.23 mm thick invar (registered trademark) strip are stacked sequentially on the surface of a stainless steel strip (i.e., a SUS304 strip) as a base material, and then they are cladded by rolling. Then, in the same manner as Example 1-1, a brazing clad material is made. The Fe concentration in the entire brazing material layer is set to be 32 wt %.

The brazing clad material is thermally treated like Example 1-1. Thereupon, brazing properties thereof are evaluated.

Comparative Example 1-5

A composite material is made such that a 1.01 mm thick invar (registered trademark) strip, a 1.0 mm thick Ti strip and a 0.42 mm thick Ni strip are stacked sequentially on the surface of a stainless steel strip (i.e., a SUS304 strip) as a base material, and then they are cladded by rolling. Then, by repeating the rolling, a brazing clad material is made in which the brazing material layer in three-layer structure (i.e., Ni/Ti/invar) has a total thickness of 70 µm. The Fe concentration in the entire brazing material layer is set to be 32 wt %.

The brazing clad material is thermally treated like Example 1-1. Thereupon, brazing properties thereof are evaluated.

In the above Examples 1-1 to 1-6 and Comparative examples 1-1 to 1-5, all the brazing clad materials are adjusted to be 8% in the ratio (T2×100/T1) of the thickness (T2) of the brazing material layer to the total thickness (T1) of the brazing clad material, by controlling the thickness of the stainless steel strip.

Further, in the above Examples 1-1 to 1-6 and Comparative examples 1-1 to 1-5, all the brazing clad materials are subjected to the thermal treatment after the clad rolling. Due to the thermal treatment, each stainless steel strip (=base material) is softened and the diffusion reacting layer is formed at each interface between the hetero-metals in the layers to compose the brazing material layer. The thermal treatment is conducted such that the diffusion reacting layers each have a thickness of 3 µm.

Conventional Example 1-1

A composite material is made such that a copper strip is stacked on the surface of a stainless steel strip (i.e., a SUS304 strip) as a base material, and then they are cladded by rolling. Then, by repeating the rolling, a brazing clad material is made in which the brazing material layer in single-layer structure (i.e., Cu layer on SUS304) has a total thickness of 70 µm.

Then, the brazing clad material is heated at a temperature of 1120° C. in the tubular furnace to melt the brazing material layer. Thereupon, brazing properties thereof are evaluated.

Conventional Example 1-2

A commercially available powder Ni brazing material (made of Ni-19 wt % Cr-10 wt % Si) is dissolved in a synthetic resin binder and then is coated on one surface of a stainless steel strip (i.e., a SUS304 strip) as a base material. The base material with the brazing material coated thereon is heated at a temperature of 1180° C. in the tubular furnace to melt the brazing material layer. Thereupon, brazing properties thereof are evaluated.

Table 1 shows the laminar structure, the Fe concentration (wt %) in the entire brazing material layer, and the value of W1/W2 in Examples 1-1 to 1-6, Comparative examples 1-1 to 1-5 and Conventional examples 1-1, 1-2. Table 1 also shows the evaluation of the brazing properties thereof. The brazing properties are evaluated for the remaining rate of the base material after brazing, the occurrence of corrosion, the fillet formation state (=metal flow property), the brazing productivity, and the comprehensive evaluation thereof.

The remaining rate of the base material is determined by cross-section observing a change in thickness of the base material before and after the brazing. Thus, when the average reduction rate and the maximum reduction rate of the thickness are small, the sample is evaluated as "good (○)", and when they are large, the sample is evaluated as "not good (×)".

The corrosion test is conducted such that the samples after the brazing are first soaked in a corrosive solution containing chlorine ion, nitrate ion and sulfate ion for 1000 hours. Then, they are taken out of the solution, and the texture of the brazing join part is observed to examine the existence of eroded part to evaluate the corrosion resistance. Further, the solution after the corrosion test is analyzed to quantitate the eluted matter from the brazing material to evaluate the corrosion degree.

The metal flow property is evaluated such that a stainless steel pipe (made of SUS304) is put on the brazing material layer of each sample, and then, when conducting the brazing thereof by heating, the shape and the sectional area of the fillet are measured at the brazing join part.

TABLE 1

| | | Laminar structure of brazing clad material | Fe concentration of brazing clad material (wt %) | W1/W2 | Remaining rate of base material | Occurrence of corrosion | Metal flow property | Brazing productivity | Comprehensive evaluation |
|---|---|---|---|---|---|---|---|---|---|
| Example | 1-1 | invar/Ti/Ni/SUS304 | 25 | 0.60 | ○ | No | ○ | ○ | ○ |
| | 1-2 | invar/Ti/Ni/SUS304 | 32 | 0.60 | ○ | No | ○ | ○ | ○ |
| | 1-3 | invar/Ti/Ni/SUS304 | 32 | 0.58 | ○ | No | ○ | ○ | ○ |
| | 1-4 | invar/Ti/Ni/SUS304 | 32 | 0.65 | ○ | No | ○ | ○ | ○ |
| | 1-5 | 42 alloy/Ti/Ni/SUS304 | 32 | 0.60 | ○ | No | ○ | ○ | ○ |
| | 1-6 | invar/Ti/Ni/SUS304 | 40 | 0.60 | ○ | No | ○ | ○ | ○ |
| Comparative example | 1-1 | invar/Ti/Ni/SUS304 | 23 | 0.60 | × | No | ○ | ○ | × |
| | 1-2 | invar/Ti/Ni/SUS304 | 43 | 0.60 | ○ | No | × | ○ | × |
| | 1-3 | invar/Ti/Ni/SUS304 | 32 | 0.55 | ○ | No | × | ○ | × |
| | 1-4 | invar/Ti/Ni/SUS304 | 32 | 0.67 | ○ | No | × | ○ | × |
| | 1-5 | Ni/Ti/invar/SUS304 | 32 | 0.60 | × | No | ○ | ○ | × |
| Conventional example | 1-1 | Cu/SUS304 | 0 | — | ○ | Occurred | ○ | ○ | × |
| | 1-2 | powder Ni brazing material/SUS304 | 0 | — | ○ | No | ○ | × | × |

○: Good
×: Not good

As shown in Table 1, the samples in Examples 1-1 to 1-6 are prepared such that the Fe—Ni alloy layer is disposed at the outermost of the brazing material layer and the Fe concentration of the brazing material layer is set to be 25 to 40 wt % and W1/W2 to be 0.58 to 0.65. Thus, the samples in Examples 1-1 to 1-6 are little subjected to "erosion of base material" in the brazing to be excellent in remaining rate of the base material after the brazing. Further, the samples in Examples 1-1 to 1-6 are not subjected to the corrosion and are excellent in metal flow property and in brazing productivity. As a result, the samples in Examples 1-1 to 1-6 are all good in the comprehensive evaluation of the brazing properties.

Although the samples in Examples 1-1 to 1-4 and 16 use the invar (registered trademark) as the Fe—Ni alloy layer disposed at the outermost of the brazing material layer, the sample in Example 1-5 uses the 42 alloy instead of the invar (registered trademark). Even in this case, the brazing properties are all good.

In contrast, the sample in Comparative example 1-1 is much in "erosion of base material" and cannot have the sufficient strength at the brazing join part since the Fe concentration of the brazing material layer is 23 wt %, which is less than the invention-defined range, 25 to 40 wt %.

The sample in Comparative example 1-2 is not good in metal flow property since the Fe concentration of the brazing material layer is 43 wt %, which is more than the invention-defined range, 25 to 40 wt %.

The sample in Comparative example 1-3 is not good in metal flow property since the W1/W2 is 0.55, which is less than the invention-defined range, 0.58 to 0.65.

The sample in Comparative example 1-4 is not good in metal flow property like Comparative example 1-3 since the W1/W2 is 0.67, which is more than the invention-defined range, 0.58 to 0.65.

Thus, since the samples in Comparative examples 1-2 to 1-4 are not good in metal flow property, the reliability (i.e., sufficient strength) cannot be secured at the brazing join part.

The sample in Comparative example 1-5 has the different laminar structure in the brazing material layer although it has the same Fe concentration and W1/W2 in the brazing material layer as Example 1-2. Thus, the sample in Comparative example 1-5 cannot prevent sufficiently "erosion of base material" since the invar (registered trademark) as the Fe—Ni alloy layer is disposed at the innermost of the brazing material layer.

The sample in Conventional example 1-1 is little in "erosion of base material" and good in the brazing properties, i.e., the metal flow property and the brazing productivity. However, since it is not sufficient in corrosion resistance, it cannot endure in use of highly corrosive environment.

The sample in Conventional example 1-2 is little in "erosion of base material" and good in the corrosion resistance and the metal flow property. However, its brazing productivity is significantly low since the brazing material is the powder brazing material and needs the organic binder.

In view of the above results, it is confirmed that the excellent brazing properties can be obtained by using the brazing clad material that the base material is integrated with the brazing material layer with the laminar structure of the Ni layer, the Ti layer and the Fe—Ni alloy layer sequentially stacked on the surface of the base material, and by setting the Fe concentration in the entire brazing material layer to be 25 to 40 wt % and the W1/W2 to be 0.58 to 0.65.

Example 2-1

A composite material is made such that a 0.42 mm thick Ni strip, a 1.0 mm thick Ti strip and a 1.01 mm thick invar (registered trademark) strip are stacked sequentially on the surface of a stainless steel strip (i.e., a SUS304 strip) as a base material, and then they are cladded by rolling. Then, by repeating the rolling, a brazing clad material is made in which the brazing material layer in three-layer structure (i.e., invar/Ti/Ni) has a total thickness of 70 μm. The Fe concentration in the entire brazing material layer is set to be 32 wt %.

Further, the thickness of the stainless steel strip is adjusted such that the ratio, T2×100/T1, of the thickness (T2) of the brazing material layer and the total thickness (T1) of the brazing clad material is 5%. The brazing clad material is subjected to the thermal treatment so as to soften the stainless steel strip after the clad rolling. Due to the thermal treatment, the diffusion reacting layer is formed at each interface between the hetero-metals in the layers to compose the brazing material layer. The thermal treatment is conducted such that the diffusion reacting layers each have a thickness of 3 μm.

The brazing clad material is preheated at 900° C. in the tubular furnace kept at a vacuum degree of $1 \times 10^{-3}$ Pa, and then it is heated at a temperature of 1200° C. to melt the brazing material layer. Thereupon, brazing properties thereof are evaluated.

Example 2-2

A brazing clad material is made which has the same composition as Example 2-1 except that T2×100/T1 thereof is set to be 8%. The brazing clad material is thermally treated like Example 2-1. Thereupon, brazing properties thereof are evaluated.

Example 2-3

A brazing clad material is made which has the same composition as Example 2-1 except that T2×100/T1 thereof is set to be 12%. The brazing clad material is thermally treated like Example 2-1. Thereupon, brazing properties thereof are evaluated.

Example 2-4

A brazing clad material is made which has the same composition as Example 2-1 except that the diffusion reacting layer thereof has a thickness of 2 μm. The brazing clad material is thermally treated like Example 2-1. Thereupon, brazing properties thereof are evaluated.

Example 2-5

A brazing clad material is made which has the same composition as Example 2-1 except that the diffusion reacting layer thereof has a thickness of 6 μm. The brazing clad material is thermally treated like Example 2-1. Thereupon, brazing properties thereof are evaluated.

Comparative Example 2-1

A brazing clad material is made which has the same composition as Example 2-1 except that T2×100/T1 thereof is set to be 4%. The brazing clad material is thermally treated like Example 2-1. Thereupon, brazing properties thereof are evaluated.

Comparative Example 2-2

A brazing clad material is made which has the same composition as Example 2-1 except that T2×100/T1 thereof is set to be 13%. The brazing clad material is thermally treated like Example 2-1. Thereupon, brazing properties thereof are evaluated.

Comparative Example 2-3

A brazing clad material is made which has the same composition as Example 2-1 except that the diffusion reacting layer thereof has a thickness of 1 μm. The brazing clad material is thermally treated like Example 2-1. Thereupon, brazing properties thereof are evaluated.

Comparative Example 2-4

A brazing clad material is made which has the same composition as Example 2-1 except that the diffusion reacting layer thereof has a thickness of 8 μm. The brazing clad material is thermally treated like Example 2-1. Thereupon, brazing properties thereof are evaluated.

Table 2 shows the laminar structure, the Fe concentration (wt %) in the entire brazing material layer, the value of T2/T1 and the thickness (μm) of the diffusion reacting layer in Examples 2-1 to 2-5 and Comparative examples 2-1 to 2-4. Table 2 also shows the evaluation of the joint property (i.e., the reliability of the brazing join part) and the processability before the brazing thereof.

The processability is evaluated such that, prior to the brazing, samples in Examples 2-1 to 2-5 and Comparative examples 2-1 to 2-4 are press-molded by using an uneven mold, and then the samples are observed in its surface and cross section to examine the existence of crack, the reduction in thickness, the flatness (i.e., the existence of warping) etc. of the base material.

TABLE 2

| | | Laminar structure of brazing clad material | Fe concentration of brazing clad material (wt %) | T2/T1 (%) | Thickness of diffusion reacting layer (μm) | Joint Property | Pressing processability |
|---|---|---|---|---|---|---|---|
| Example | 2-1 | invar/Ti/Ni/SUS304 | 32 | 5 | 3 | o | o (no crack in base material, little warping) |
| | 2-2 | invar/Ti/Ni/SUS304 | 32 | 8 | 3 | o | o (no crack in base material, little warping) |
| | 2-3 | invar/Ti/Ni/SUS304 | 32 | 12 | 3 | o | o (no crack in base material, little warping) |
| | 2-4 | invar/Ti/Ni/SUS304 | 32 | 8 | 2 | o | o (no crack in base material, little warping) |
| | 2-5 | invar/Ti/Ni/SUS304 | 32 | 8 | 6 | o | o (no crack in base material, little warping) |
| Comparative example | 2-1 | invar/Ti/Ni/SUS304 | 32 | 4 | 3 | x | x (peeling in brazing material) |
| | 2-2 | invar/Ti/Ni/SUS304 | 32 | 13 | 3 | o | x (warping occurred, cost increased) |
| | 2-3 | invar/Ti/Ni/SUS304 | 32 | 8 | 1 | x | x (warping occurred, broken in part) |
| | 2-4 | invar/Ti/Ni/SUS304 | 32 | 8 | 8 | o | x (crack in base material, peeling in brazing material, surface roughened) | o: Good,
x: Not good

As shown in Table 2, the samples in Examples 2-1 to 2-5 are prepared such that the T2/T1 is set to be 5 to 12% and the thickness of the diffusion reacting layer to be 2 to 6 μm. Thus, since the samples in Examples 2-1 to 2-5 have the sufficient thickness in the brazing material layer, they can have sufficient joint strength after the brazing and can have excellent reliability at the brazing join part. Further, the samples in Examples 2-1 to 2-5 have no crack, little warping in the base material and no peeling in the brazing material layer when they are pressed. Thus, the samples in Examples 2-1 to 2-5 are excellent in processability.

In contrast, the sample in Comparative example 2-1 cannot have the sufficient joint strength after the brazing and the good reliability at the brazing join part, since T2/T1 is 4%, which is less than invention-defined range, 5 to 12% and, thus, the brazing material layer does not have the sufficient thickness. Further, the sample in Comparative example 2-1 does not have the good processability such that the brazing material layer is peeled off from the base material in the press-molding.

The sample in Comparative example 2-2 can have the sufficient joint strength after the brazing. However, since its T2/T1 is 13%, which is more than invention-defined range, 5 to 12%, and thus the thickness of the brazing material layer is more than necessary, it must be subjected to an increase in manufacturing cost. Further, the sample in Comparative example 2-2 does not have the good processability such that the base material is subjected to warping in the press-molding.

The sample in Comparative example 2-3 has the diffusion reacting layer with a thickness of 1 μm, which is less than the invention-defined range, 2 to 6 μm, since the thermal treatment after the clad rolling is insufficient. Therefore, the sample in Comparative example 2-3 does not have the good processability such that the base material is not sufficiently softened, the base material is subjected to warping in the press-molding, and a portion of the brazing join part is broken. Further, due to the warping, the contact force may be insufficient to lower the reliability of the brazing join part. The sample in Comparative example 2-4 has the diffusion reacting layer with a thickness of 8 μm, which is more than the invention-defined range, 2 to 6 μm, since the thermal treatment after the clad rolling is excessive. Therefore, in the press-molding, a crack originating from the diffusion reacting layer is transmitted and penetrated into the base material.

Further, the sample in Comparative example 2-4 does not have the good processability such that the brazing material layer is peeled off from the base material in the press-molding, and surface roughness occurs at the surface of the sample.

In view of the above results, it is confirmed that the excellent brazing properties and pressing processability can be obtained by setting the T2/T1 to be 5 to 12 wt % and the thickness of the diffusion reacting layer to be 2 to 6 μm.

Example 3-1

A brazing clad material is produced which has the same composition as Example 1-2. The brazing clad material is preheated at 900° C. in the tubular furnace kept at a vacuum degree of $1 \times 10^{-2}$ Pa, and then it is heated at a temperature of 1200° C. to melt the brazing material layer. Thereupon, brazing properties thereof are evaluated.

Example 3-2

A brazing clad material is produced which has the same composition as Example 1-2. The brazing clad material is preheated at 900° C. in the tubular furnace kept at a vacuum degree of $1 \times 10^{-3}$ Pa, and then it is heated at a temperature of 1200° C. to melt the brazing material layer. Thereupon, brazing properties thereof are evaluated.

Comparative Example 3-1

A brazing clad material is produced which has the same composition as Example 1-2. The brazing clad material is preheated at 900° C. in the tubular furnace kept at a vacuum degree of $1 \times 10^{-1}$ Pa, and then it is heated at a temperature of 1200° C. to melt the brazing material layer. Thereupon, brazing properties thereof are evaluated.

Comparative Example 3-2

A brazing clad material is produced which has the same composition as Example 1-2. The brazing clad material is preheated at 900° C. in the tubular furnace kept at a vacuum degree of $1 \times 10^{-2}$ Pa while adding a small amount of $N_2$ gas inside thereof, and then it is heated at a temperature of 1200° C. to melt the brazing material layer. Thereupon, brazing properties thereof are evaluated.

Table 3 shows the laminar structure, the Fe concentration (wt %) in the entire brazing material layer and the value of W1/W2 in Examples 3-1 to 3-2 and Comparative examples 3-1 to 3-2. Table 3 also shows the vacuum degree in the brazing atmosphere and the evaluation of the meal flow property before the brazing thereof.

The metal flow property is evaluated such as "good (○)" for sufficient metal flow, "insufficient (Δ)" for insufficient metal flow and "not good (×)" for bad metal flow.

TABLE 3

|  |  | Laminar structure of brazing clad material | Fe concentration of brazing clad material (wt %) | W1/W2 | Vacuum degree (Pa) in brazing atmosphere | Metal flow Property |
|---|---|---|---|---|---|---|
| Example | 3-1 | invar/Ti/Ni/SUS304 | 32 | 0.60 | $1 \times 10^{-2}$ | ○ |
|  | 3-2 | invar/Ti/Ni/SUS304 | 32 | 0.60 | $1 \times 10^{-3}$ | ○ |
| Comparative example | 3-1 | invar/Ti/Ni/SUS304 | 32 | 0.60 | $1 \times 10^{-1}$ | Δ |
|  | 3-2 | invar/Ti/Ni/SUS304 | 32 | 0.60 | $1 \times 10^{-2}$, $N_2$ gass added | × |

○: Good,
Δ: Insufficient,
×: Not good

As shown in Table 3, the samples in Examples 3-1 and 3-2 are prepared such that the brazing atmosphere is set to have a vacuum degree of $1 \times 10^{-2}$ Pa or less during the brazing. Thus, the samples in Examples 3-1 and 3-2 can have the good metal flow property. Further, it is confirmed that as the vacuum degree lowers, the metal flow property is enhanced.

In contrast, the sample in Comparative example 3-1 does not have the sufficient metal flow property since the brazing atmosphere is set to have a vacuum degree of $1 \times 10^{-1}$ Pa, which is more than the invention-defined range, $1 \times 10^{-2}$ Pa or less, during the brazing.

The sample in Comparative example 3-2 has the bad metal flow property since the brazing atmosphere contains $N_2$ gas although the brazing atmosphere is set to have a vacuum degree of $1 \times 10^{-2}$ Pa, which satisfies the invention-defined range, $1 \times 10^{-2}$ Pa or less, during the brazing.

In view of the above results, it is confirmed that the excellent metal flow property can be obtained by setting the brazing atmosphere to have a vacuum degree of $1 \times 10^{-2}$ Pa or less, preferably to have a vacuum degree of $1 \times 10^{-2}$ Pa or less and not to contain $N_2$ gas.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A brazing clad material, comprising:
   a composite material that comprises a base material and a brazing material layer formed integrally on the base material, wherein the brazing material layer comprises a Ni or Ni alloy layer, a Ti or Ti alloy layer and a Fe—Ni alloy layer that are sequentially stacked in this order on the base material, wherein the brazing material layer comprises a Fe concentration of 25 to 40 wt % in the entire brazing material layer, wherein the brazing material layer satisfies a ratio of W1/W2 to be 0.56 to 0.66, where W1 is a weight of Ni contained in the entire brazing material layer and W2 is a total weight of Ni and Ti contained in the entire brazing material layer, wherein the brazing material layer comprises a diffusion reacting layer with a thickness of 2 to 6 μm, and wherein the diffusion reacting layer is formed at an interface between two hetero-metals of the Ni or Ni alloy layer, the Ti or Ti alloy layer and the Fe—Ni alloy layer to compose the brazing material layer.

2. The brazing clad material according to claim 1, wherein:
the composite material satisfies a ratio of T2/T1 to be 0.05 to 0.12, where T2 is a thickness of the brazing material layer and T1 is a total thickness of the brazing clad material, as determined before cladding.

3. The brazing clad material according to claim 1, wherein:
the Fe—Ni alloy layer comprises Fe-35 to 45 mass % Ni.

4. The brazing clad material according to claim 1, wherein:
the base material comprises an alloy comprising Fe as a main component.

5. The brazing clad material according to claim 4, wherein:
the alloy comprising Fe as a main component comprises a stainless steel.

6. A method of brazing the brazing clad material as defined in claim 1 to a brazed member, comprising the steps of:
preheating the brazing clad material at a temperature of 800 to 940° C. and
brazing the preheated brazing clad material to the brazed member in a vacuum atmosphere at a temperature of 1100 to 1200° C.

7. The method according to claim 6, wherein:
the vacuum atmosphere comprises a vacuum degree of $1 \times 10^{-2}$ Pa or less.

8. The method according to claim 6, wherein:
the vacuum atmosphere comprises a gas atmosphere substantially not containing $N_2$ gas and a vacuum degree of $1 \times 10^{-2}$ Pa or less.

9. A brazing product, comprising:
the brazing clad material as defined in claim 1; and
a brazed member,
wherein the brazing clad material is brazed to the brazed member.

10. A brazing product, comprising:
a brazing clad material, comprising:
a composite material that comprises a base material and a brazing material layer formed integrally on the base material,
wherein the brazing material layer comprises a Ni or Ni alloy layer, a Ti or Ti alloy layer and a Fe—Ni alloy layer that are sequentially stacked in this order on the base material,
wherein the brazing material layer comprises a Fe concentration of 25 to 40 wt % in the entire brazing material layer,
wherein the brazing material layer satisfies a ratio of W1/W2 to be 0.56 to 0.66, where W1 is a weight of Ni contained in the entire brazing material layer and W2 is a total weight of Ni and Ti contained in the entire brazing material layer,
wherein the brazing material layer comprises a diffusion reacting layer with a thickness of 2 to 6 μm,
wherein the diffusion reacting layer is formed at an interface between two hetero-metals of the Ni or Ni alloy layer, the Ti or Ti alloy layer and the Fe—Ni alloy layer to compose the brazing material layer, and
wherein the brazing clad material is brazed to the brazed member by a method comprising the steps of:
preheating the brazing clad material at a temperature of 800 to 940° C. and
brazing the preheated brazing clad material to the brazed member in a vacuum atmosphere at a temperature of 1100 to 1200° C.

* * * * *